United States Patent [19]

Elata

[11] Patent Number: 4,465,056
[45] Date of Patent: Aug. 14, 1984

[54] METHOD AND MEANS FOR REMOVING HEAT FROM A HEAT STORAGE LAYER OF WATER

[75] Inventor: Chaim Elata, Omer, Israel

[73] Assignee: Solmat Systems, Ltd., Yavne, Israel

[21] Appl. No.: 266,466

[22] Filed: May 22, 1981

[51] Int. Cl.$^3$ .............................................. F24J 3/02
[52] U.S. Cl. ................................ 126/415; 126/430; 126/417; 126/452; 4/506; 4/498
[58] Field of Search ............... 126/415, 452, 416, 417, 126/430; 165/1, 2, 104.31; 159/15; 23/295 S, 298; 203/10, 100, DIG. 1; 202/234; 4/498, 493, 506

[56] References Cited

U.S. PATENT DOCUMENTS

| | | | |
|---|---|---|---|
| 3,372,691 | 3/1968 | Shachar | 165/1 |
| 4,031,952 | 6/1977 | Contour | 165/45 X |
| 4,091,863 | 5/1978 | Schroder | 126/400 X |
| 4,158,384 | 6/1979 | Brautigam | 126/400 X |
| 4,159,736 | 7/1979 | Denis et al. | 126/400 X |
| 4,253,446 | 3/1981 | Müller | 126/437 X |
| 4,326,498 | 4/1982 | Eckland | 126/415 |

Primary Examiner—Larry Jones
Attorney, Agent, or Firm—Sandler & Greenblum

[57] ABSTRACT

A heat storage pond, of the type having a lower heat storage layer of water covered by an insulating layer, has a partition that extends from a location on the periphery of the pond toward an opposite peripheral location, but terminates short thereof, for dividing at least the heat storage layer into two interconnecting portions. Water from the heat storage layer in one of the portions is drawn off and passed through a heat exchanger for extracting heat from the water. The water passed through the heat exchanger is then returned to the heat storage layer in the other of the two portions thereof, the partition effecting a physical separation between the intake and discharge. This arrangement sets up a circulation pattern in the lower region of the heat storage layer, while water in the other portion flows away from the point at which the cooler water is discharged into the heat storage layer, the only interconnection between the portions being in the region at the free end of the partition. Thus, the effective length of travel between the intake and discharge points is at least double the length of the partition.

22 Claims, 6 Drawing Figures

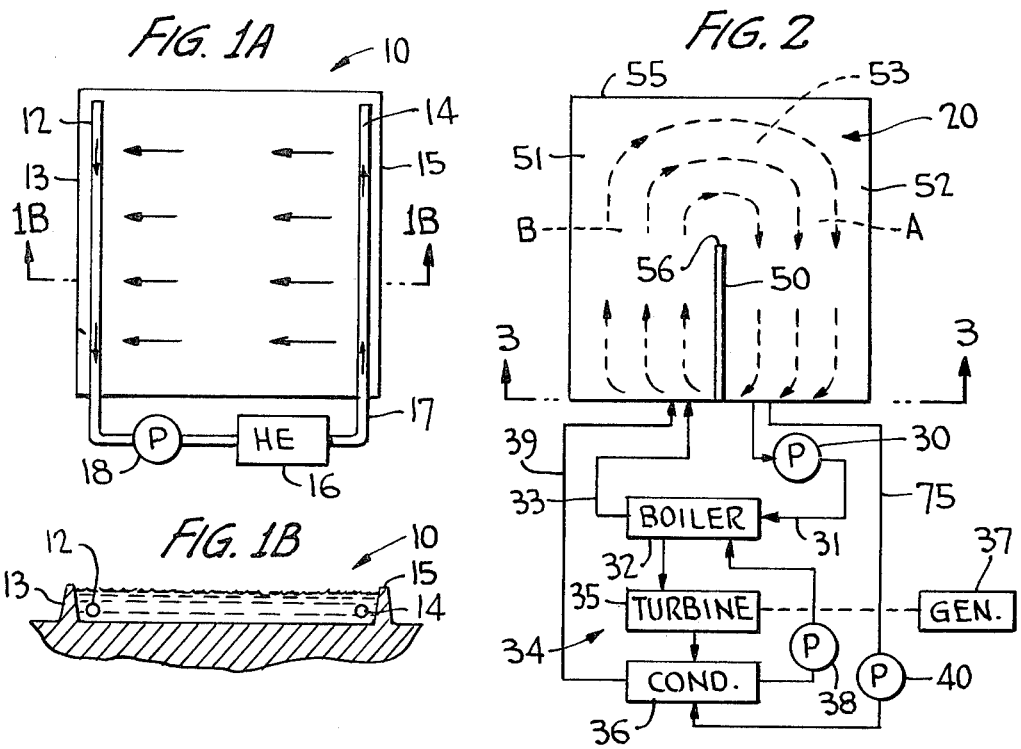
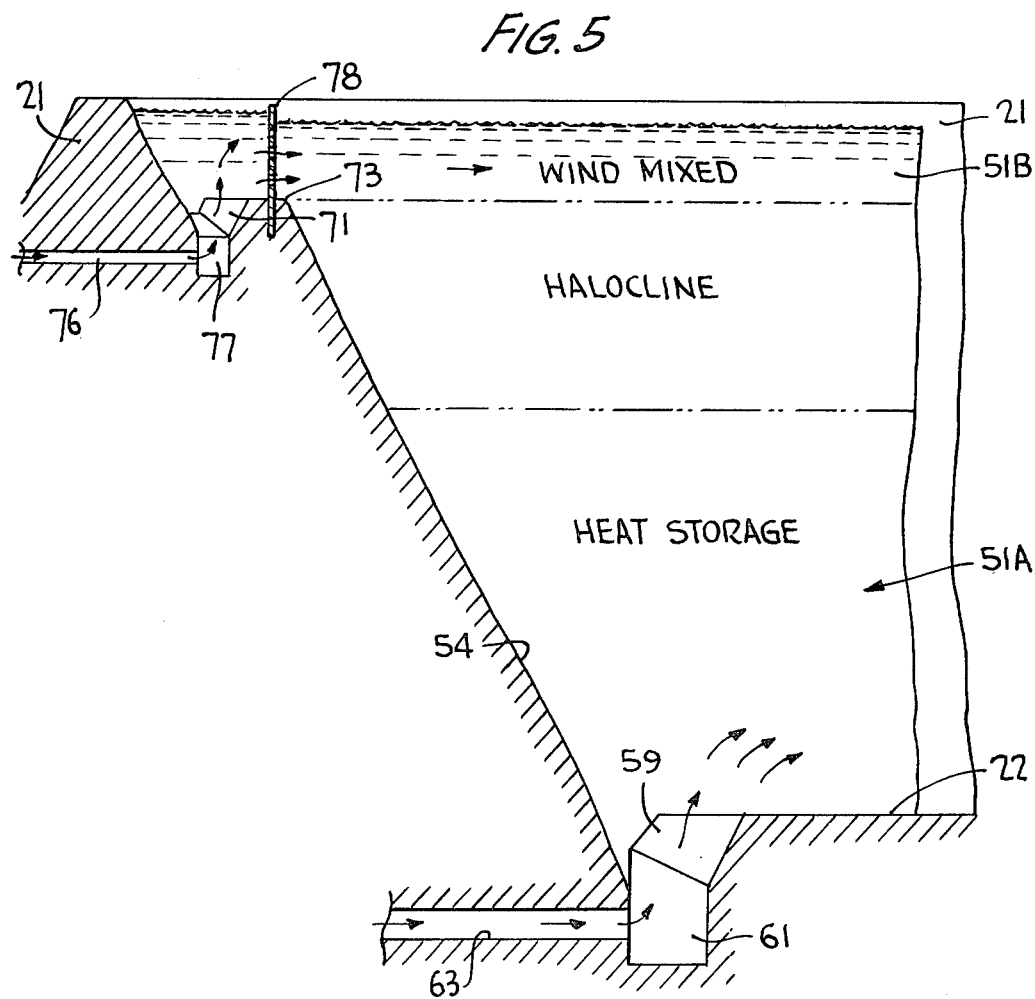

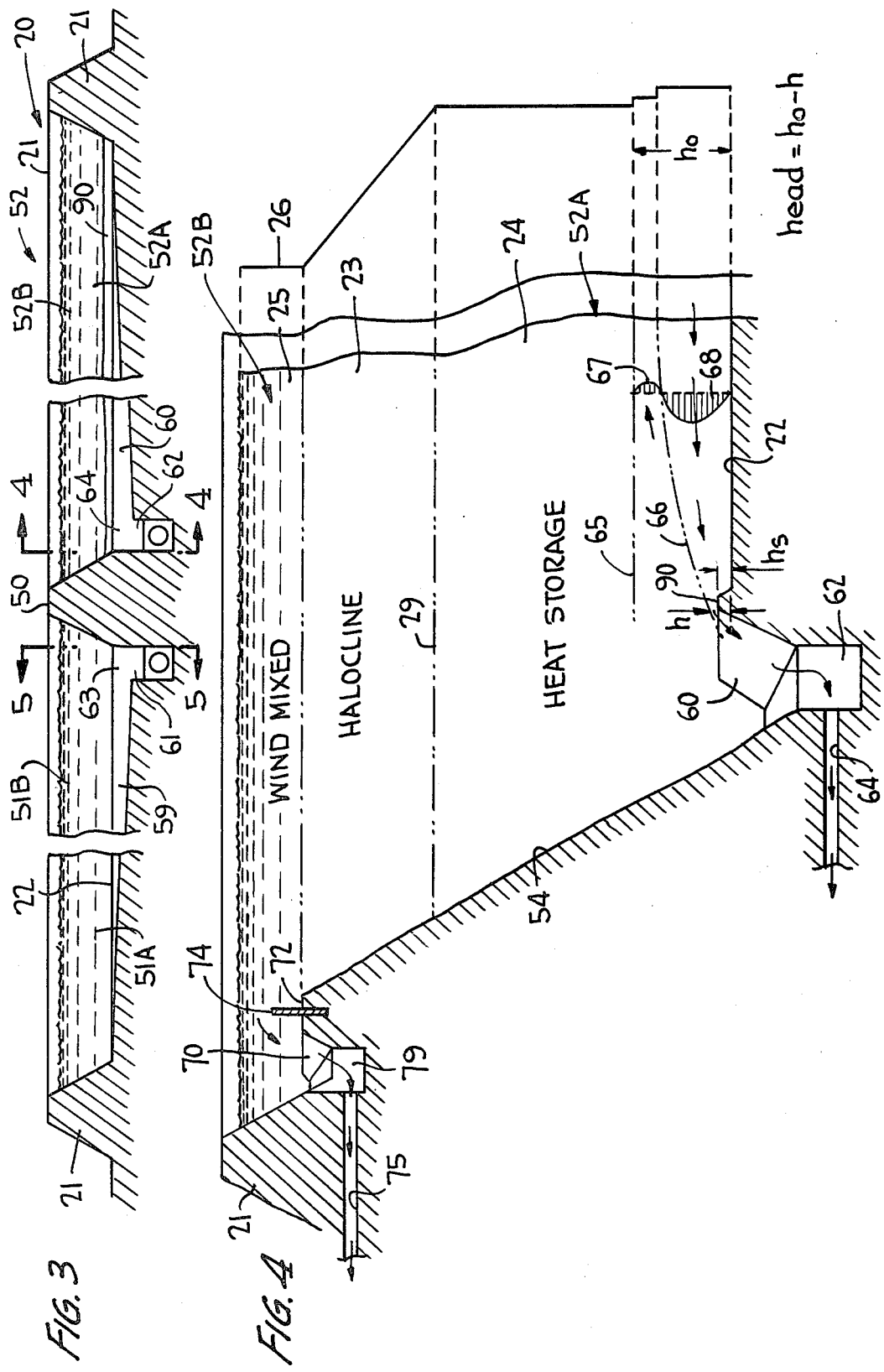

METHOD AND MEANS FOR REMOVING HEAT FROM A HEAT STORAGE LAYER OF WATER

DESCRIPTION

1. Technical Field

This invention relates to a method of and means for removing heat from a heat storage layer of water, and, more particularly, to a heat storage layer that is part of a solar pond.

2. Background Art

Solar ponds for generating electrical energy have been constructed and successfully operated. The largest pond known is located at Ein Bokek, and is about 10,000 $m^2$ in area contained in an earthen embankment covered with a rubberized fabric liner that is impervious to water. The Ein Bokek pond is about 5 m deep, and is constructed in the form of a convective heat storage layer about 3.5 m deep having a salinity of about 30%, over which is located a non-convective halocline about 1.25 m thickness having a salinity that increases substantially linearly with depth from about 10% at the top to about 30% at the bottom, and an upper wind-mixed layer about 25 cm thick that forms the surface of the pond and is of uniform salinity of about 10%.

The pond was completed in the spring of 1979; and during the summer, the heat storage layer was heated to about 90° C. The process, as is well known, involves the absorption of solar radiation by the halocline, the inverse density gradient in the halocline established by the salinity gradient, stabilizing the halocline against heat-induced or convection currents that would normally arise due to the inverse temperature gradient established in the halocline. As a consequence, the temperature at the bottom of the halocline exceeds the temperature at the top; and heat is transferred into the heat storage layer. Furthermore, the non-convective halocline serves to insulate the heat storage layer from conductive heat loss during the relatively cool nights when solar radiation is absent, and during the fall of the year when solar radiation is reduced and the air temperature is lower.

A power plant to utilize the heat produced by the Ein Bokek pond includes a boiler containing an organic fluid, and through which hot brine from the heat storage layer is pumped. The heated organic fluid vaporizes in the boiler and is applied to a 500 Kw turbine that drives a generator. The exhaust vapors from the turbine are cooled in a condenser through which cooling water is circulated. In December, 1979, this power plant was operated for the first time, producing peak power for several hours.

In order to provide the boiler with water from the heat storage layer in a manner least disruptive to the stability of the pond, a pair of headers in the form of perforated pipes running the length of the pond (about 100 m) could be provided on opposite sides thereof. Hot brine from the heat storage layer would be drawn into the perforated pipe located on one side of the pond and conveyed to the boiler of the power plant, and cooled brine exiting from the boiler would be conveyed to the perforated pipe located on the opposite side. This technique will evenly distribute the flow of water extracted from and then injected back into the pond. In addition to the 200 m of perforated piping, additional piping would be required to convey hot brine in the intake header into the boiler, and to convey the cooled brine back to the outlet header on the opposite side of the pond. Thus, about 300 m of pipe would be required for a 100×100 m pond.

The Ein Bokek pond is too small for a commercially viable power plant, which preferably should be capable of generating, say, 5 Mw peak power for about four hours per day, or from 0.5–1.0 Mw on a continuous, 24-hour basis throughout the year. A pond, to achieve this output, would have to be about twenty-five times larger than the Ein Bokek pond; i.e., about 500×500 m, or about 60 acres. The hydraulic requirements of a pond of these dimensions are impressive: at peak power, about 10,000 tons of water per hour must be pumped from the heat storage layer through a heat exchanger constituting the boiler of the power plant, and then returned to the heat storage layer in such a way that a non-turbulent exchange of brine takes place in the heat storage layer. Furthermore, the inlet at which the hottest brine in the system is collected for presentation to the heat exchanger must be isolated physically, to as great an extent as possible, from the outlet into which the cooled brine is discharged. To apply the Ein Bokek approach would require two headers each of 500 m long, each about 2–3 m in diameter, along opposite edges of the pond, plus some 500 m of additional, insulated piping to connect the headers to the boiler. The capital expense of piping of this size and length constitutes a substantial portion of the cost of constructing a 5 Mw power plant; and the pumping required to sustain the large volumetric flow of brine would constitute an appreciable portion of the power output of the power plant. For this reason, the economics of a large-scale solar pond have not been promising.

It is, therefore, an object of the present invention to provide a new and improved method of and means for removing heat from a heat storage layer wherein the amount of piping is significantly reduced from that previously known in the prior art.

DISCLOSURE OF INVENTION

In accordance with the present invention, heat is removed from a heat storage layer of water by placing in the pond a partition that extends from a location on the periphery of the pond toward an opposite peripheral location, but terminates short thereof, for dividing at least the heat storage layer into two interconnected portions. Water from the heat storage layer in one of the portions is drawn off and passed through a heat exchanger for extracting heat from the water. The water passed through the heat exchanger is then returned to the heat storage layer in the other of the two portions thereof, the partition effecting a physical separation between the intake and discharge. This arrangement sets up a circulation pattern in the lower region of the heat storage layer wherein the water in one of the portions flows towards the point at which water is drawn from the heat storage layer, while water in the other portion flows away from the point at which the cooler water is discharged into the heat storage layer, the only interconnection between the portions being in the region beyond the free end of the partition. Thus, the effective length of travel between the intake and discharge points is at least double the length of the partition.

Preferably, the partition is insulated; and the distance between the termination of the partition and the opposite periphery should be such that the distance is substantially the same as the distance between the partition and opposite lateral edges of the pond. That is to say, if the pond is square, the partition should extend about half-way across the pond. Optionally, the partition may lie along the diagonal of the pond.

In the preferred arrangement, a trough in each of the two portions at the bottom of the pond opening into the heat storage layer is provided, each trough being located adjacent the edge of the pond where the partition is connected, and extending transversely to the direction of the partition for acting as a header for water that passes through the piping. The cross-section of each of the troughs changes as a function of distance from the partition, the cross-sectional area of each trough being greatest adjacent the partition. The heat exchanger is located near the edge of the pond to which the partition is connected, thus minimizing the amount of piping connecting the troughs at their deepest points to the heat exchanger. This is the only piping requirement for transferring brine to and from the heat storage layer.

In the preferred embodiment of the invention, the heat storage pond is a solar pond, and the insulating layer at the top of the heat storage layer is a non-convective halocline whose salinity increases with depth, and which is covered with a wind-mixed layer of substantially uniform salinity. Such a pond is combined with a power plant for converting heat extracted by the heat exchanger into electrical energy. Specifically, the heat exchanger may contain an organic fluid that is vaporized when water from the heat storage layer is pumped through the heat exchanger, and the power plant includes a turbine driven by vaporized fluid produced by the boiler for producing electrical energy. A condenser for condensing vapor exhausted by the turbine is also provided, as is means for returning the condensate produced by the condenser to the heat exchanger.

In one form of the invention, the condenser is cooled with water from the wind-mixed layer. In this case, an auxiliary trough is provided in the wall defining the edge of the pond to which the partition is attached, thereby dividing the wind-mixed layer into two interconnected portions. Each auxiliary trough extends transversely to the direction of the partition for acting as a header for water that passes through the condenser. This arrangement further minimizes the amount of piping required for the condenser cooling water.

BRIEF DESCRIPTION OF DRAWINGS

An embodiment of the invention described below is shown in the accompanying drawings, wherein:

FIG. 1A is a schematic-plan view of the prior art technique of removing heat from a heat storage layer of water in a solar pond as represented by the Ein Bokek pond;

FIG. 1B is a sectional view of the pond shown in FIG. 1A taken along the line 1B—1B of FIG. 1A;

FIG. 2 is a schematic-plan view of a pond into which a partition has been introduced for the purpose of dividing the pond, including the heat storage layer and the wind-mixed layer, into two separate portions in accordance with the present invention;

FIG. 3 is a sectional view taken along the line 3—3 of FIG. 2;

FIG. 4 is a sectional view through the solar pond shown in FIG. 3 taken along the line 4—4; and FIG. 5 is a sectional view of the solar pond shown in FIG. 3 taken along the line 5—5 of this figure.

DETAILED DESCRIPTION OF THE INVENTION

Referring now to FIGS. 1A and 1B, reference numeral 10 designates a conventional solar pond such as the Ein Bokek pond. As indicated previously, this pond is approximately 100×100 m in size, and has perforated intake pipe 12 adjacent one edge 13 of the pond near the bottom, and perforated discharge pipe 14 adjacent the opposite edge 15 of pond near the bottom. Headers 12 and 14 are connected to heat exchanger 16 by piping arrangement 17. Pump 18 operates to draw hot brine from the heat storage layer into intake header 12, and deliver the hot brine to heat exchanger 16, after which the cooled brine is returned to the heat storage layer via discharge header 14. The flow of brine in the heat storage layer due to the operation of pump 18 is as indicated by arrows 19 in FIG. 1A.

In scaling up the Ein Bokek pond to a size of 250,000 $m^2$ in order to provide a 5 Mw peak power plant, approximately 10,000 tons of water per hour must be provided to the boiler of the power plant. Following the Ein Bokek approach illustrated in FIGS. 1A and 1B, over 1,000 m of 2-3 m diameter pipe would have to be used. According to the present invention, the need for such a large amount of pipe is eliminated. The arrangement utilized is shown in FIG. 2, wherein a solar pond according to the present invention is designated by reference numeral 20 and is defined by four earthen mounds 21 defining connected levees for containing the water in the pond. In order to prevent leakage of water in the pond into the ground, the interior of the pond, i.e., the inner faces of the mounds 21 and the bottom 22 of the pond may be lined with a layer that is water-impermeable, such layer preferably being in the form of a rubberized fabric that will maintain its integrity at temperatures exceeding 100° C. Where the ground level of water in the vicinity of the pond warrants, the bottom of the pond beneath the liner may be insulated to reduced heat loss from the heat storage layer to the aquifer.

A solar pond sufficient to generate 5 Mw peak power at the approximate latitude of Ein Bokek should be approximately 5 m deep. As shown in FIG. 4, the solar pond comprises three main layers: halocline 23 interposed between the lower heat storage layer 24 and upper wind-mixed layer 25. The salinity profile through the pond is illustrated by curve 26. That is to say, the salinity in the wind-mixed layer is substantially uniform, because this layer is convective. The salinity profile of the halocline increases monotonically with depth, as indicated by curve 26, so that the salinity near the bottom of the halocline is approximately 30%. The salinity of heat storage layer 24 is substantially constant with depth.

As is well known, solar radiation, indicated by reference numeral 27, incident on the surface 28 of the solar pond penetrates through the wind-mixed layer and into the halocline. Heat absorbed in the wind-mixed layer and locally raising the temperature of water in this layer is lost to the atmosphere by reason of the convection currents in the wind-mixed layer, which carry the locally heated water to the surface, where heat is lost to the atmosphere. Heat absorbed in the halocline, however, is trapped therein, because this layer is non-convective due to its salinity distribution. That is to say, the density of the brine at a lower level in the halocline is not reduced sufficiently by the heating of the water in this lower level to reduce its density below the density of the layer in the halocline immediately above the heated layer. As a consequence, the temperature profile in the halocline and in the wind-mixed layer closely match the salinity profile. Heat is trapped in the heat storage layer below the halocline. After the lapse of a period of time dependent upon the latitude of the solar pond, the water in the heat storage layer will be heated to a predetermined temperature close to 100° C.

Heat stored in the heat storage layer can be removed on a continuous basis, thereby setting up a steady-state condition of the temperature in the heat storage layer, or it can be removed periodically in order to extract a peak amount of heat from the heat storage layer. In the latter case, the temperature in the heat storage layer would vary during the course of the heat withdrawal.

Pond 20, according to the present invention, utilizes partition 50 for dividing the pond into two portions 51 and 52 that are interconnected at 53. Partition 50 extends from one edge 54 of the pond toward opposite edge 55, but terminates short thereof at free end 56 to establish interconnection 53 between portions 51 and 52.

Interconnection 53 constitutes a portion of a U-shaped flow path in the heat storage layer and is defined by the distance between termination 56 of the partition and opposite edge 55. In order to prevent the interconnection from exercising a "throat" effect on the flow in the heat storage layer and causing flow through the interconnection to become critical, the distance between termination 56 and edge 55 should be no less than about ⅔ of the free flow width of the flow. To achieve this end, the distance between termination 56 and edge 55 should be comparable to the distance between the partition and the opposite lateral edges of the pond. That is to say, if the pond is square, the partition should bisect the pond and extend about half-way across. Optionally, the partition could extend along the diagonal of the pond.

When water from only the heat storage layer of the pond is to be exchanged from one portion of the pond to the other, partition 50 need extend vertically no higher than interface 29 of the heat storage layer. However, it is preferred, for constructional purposes, to have partition 50 extend to the upper level of walls 21 as shown in FIG. 3, thereby dividing the wind-mixed layer as well as the heat storage layer into two portions, portion 51 of the pond comprising heat storage portion 51A and wind-mixed portion 51B, and portion 52 of the pond comprising heat storage portion 52A and wind-mixed portion 52B.

Along edge 54 of the pond, where partition 50 is connected to wall 21, troughs 59 and 60 (FIG. 3) extend transversely to the direction of partition 50. The bottom of each of these troughs extends below the level of bottom 22, and is inclined with respect to the bottom as shown in FIG. 3. In addition, the width of each trough decreases as the distance away from partition 50 increases. As a consequence, the cross-section of each trough increases in a direction towards the partition, allowing trough 60 to act as a header for brine extracted from the heat storage pond, and trough 59 to act as a header for brine discharged into the heat storage layer.

Adjacent partition 50 on each side thereof are sumps 61, 62 (see FIG. 3) to which header pipes 63, 64 are respectively connected. These pipes extend through the base of wall 21 for respective connection to the inlet and outlet piping associated with boiler 32 (FIG. 2), which is part of power plant 34. In addition to boiler 32, power plant 34 comprises organic fluid turbine 35 which drives generator 37 and condenser 36.

Hot brine from the heat storage layer is drawn by pump 30 (FIG. 2) through piping 31 into boiler 32 containing an organic working fluid such as Freon. The organic working fluid is vaporized by the boiler, and the cooled brine is then discharged into the heat storage layer by piping 33.

Organic fluid in boiler 32, vaporized by the heat transfer that takes place due to the hot brine being pumped through the boiler, is piped to turbine 35, where expansion of the vaporized working fluid takes place, causing the turbine to drive generator 37 and produce electricity. Exhaust from the turbine is applied to condenser 36, where the exhaust vapors are condensed and returned to boiler 32 via pump 38.

Water for cooling condenser 36 may be derived from a cooling pond, separate from the solar pond, or from wind-mixed layer 25 of pond 20, utilizing piping 39. In the embodiment shown in the drawing, pump 40 draws water from the wind-mixed layer and delivers it to the water-cooling side of condenser 36, the warmed cooling water then being returned to the wind-mixed layer. The arrangement for utilizing the wind-mixed layer as the heat sink of the power plant is described in detail below.

In order to develop 5 Mw peak power from a $500 \times 500$ m pond, pump 30 must deliver approximately 10,000 m$^3$/hr to the boiler from the heat storage layer. This volume flows in portion 51A of the heat storage layer, following paths indicated by broken arrows A in FIG. 2. into intake trough 60 across the entire 250 m length of the trough. From fluid dynamics, it can be shown that the Reynolds number and the Froude number for hot brine under the flow conditions described above will result in laminar flow near the bottom of the pond. Specifically, a two-layer flow regime as indicated in FIG. 4 will be established adjacent the bottom of the pond. The salinity profile across this two-layer flow regime will be discontinuous, as shown by the lower portion of curve 26, to establish and maintain the flow pattern near the bottom of the pond. Such a pattern is indicated generally by the chain lines 65, 66, the upper layer of the two-layer flow being in a negative sense as indicated by velocity profile 67, as compared with the larger bottom layer, which will have a positive direction as indicated by profile 68. The relative sizes of the two-layer flow pattern at the bottom of the pond is exaggerated in FIG. 4, the actual thickness of the lower of the two-layer flow regimen being substantially uniform from the far end of the pond adjacent edge 55 to the near edge of the pond 54. For a pond of the size indicated above under the flow conditions indicated, the flow will be sub-critical at the intake portion of the pond.

Preferably, a skimmer wall is provided along trough 60 that constitutes the outlet of the heat storage layer. As shown in FIG. 4, skimmer wall 90 projects upwardly from bottom 22 of the pond and runs continuously from one lateral edge 21 of the pond to partition 50 on the side of the pond that forms the outlet for the hot brine extracted from the heat storage layer. If the height of the flow layer in the heat storage layer is h, then the height $h_s$ of the skimmer wall should not exceed ⅓ h.

Discharge trough 59 which receives cooled brine after it passes through boiler 32 is designed and operates in essentially the same manner as that described above in connection with intake trough 60. In this case, however, the water being discharged into heat storage portion 51A will be cooler, and thus more dense, than the rest of the water in this portion of the heat storage layer. As a consequence, the discharge water will flow along the bottom 22 in portion 51, generally following the path indicated by the broken arrows B in FIG. 2. As a consequence of the relatively long path between the discharge trough and the intake trough, significant isolation is achieved between hot brine pumped into the boiler and cooler brine discharged from the boiler. However, as indicated in FIG. 2, intake 64 and discharge 63 are physically adjacent each other, being separated merely by the thickness of partition 50.

Under some circumstances, but not in every instance, the relatively cool water in wind-mixed layer 25 can be utilized as cooling water for condenser 36. When this is practical, wall 21 defining edge 54 of the pond is provided, adjacent the top thereof, with auxiliary troughs 70 and 71, as indicated in FIGS. 4 and 5. These auxiliary troughs are built into the wall 21 to which partition is attached, and extend in a direction transverse to the direction of the partition. Specifically, wall 21 is provided with extensions 72 and 73, as indicated in FIGS. 4 and 5, at a depth approximately equal to the depth of wind-mixed layer 25. Because the actual depth of the wind-mixed layer varies from time to time in accordance with the weather conditions experienced by the pond, it may be necessary to provide baffle 74 in the intake auxiliary trough 70.

Cool water from portion 52B of the wind-mixed layer flows over baffle 74 into auxiliary intake trough 70, and then into sump 79 adjacent partition 50, and then through piping 75 to condenser 36 as a consequence of the operation of pump 40. After leaving condenser 36, the water, which has been warmed as a result of extracting heat from the exhaust vapors in the condenser, is returned through discharge duct 76 to sump 77 connected to auxiliary discharge trough 71.

On the discharge side of partition 50, extension 73 is provided with a perforated baffle 78 in order to insure that the discharge of water into the wind-mixed layer will occur in a way that will minimize disturbances to the wind-mixed layer, and thus disturbances to halocline 23.

Under peak-power conditions, the operation with respect to the pond described above may be marginal, but under steady-state conditions, where the volume of water flow is significantly smaller, the use of the wind-mixed layer as the source of cooling water for the condenser of the power plant should be practical.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. A method for removing heat from a solar heat storage salt pond of the type having a lower heat storage layer of water covered by an insulating layer, comprising the steps of:
   (a) placing a vertical partition in the pond extending from a location on the periphery of the pond toward an opposite peripheral location, but terminating short thereof, for dividing at least the heat storage layer into two interconnected portions;
   (b) drawing off water from the heat storage layer in one of said portions;
   (c) passing the drawn-off water through a heat exchanger for extracting heat from the water; and
   (d) returning the water passed through the heat exchanger to the heat storage layer in the other of said portions.

2. A method according to claim 1 wherein the partition extends about half-way across the pond.

3. A heat removal system comprising:
   (a) a solar heat storage salt pond having given longitudinal and transverse dimensions, and having a heat storage layer of water at the bottom of the pond and an insulating layer at the top, covering the heat storage layer;
   (b) a vertical partition in the pond for dividing at least the heat storage layer into two interconnected heat storage portions;
   (c) a heat exchanger; and
   (d) piping connecting the heat exchanger between the two portions.

4. A heat removal system according to claim 3 including a pump for pumping water from one of the two heat storage portions to the other through the heat exchanger.

5. A heat removal system according to claim 3 wherein the partition extends from one edge of the pond towards an opposite edge, but terminates short thereof, to establish an interconnection between the two heat storage portions, the heat exchanger being connected between the two heat storage portions at said one edge to minimize the amount of piping required.

6. A heat removal system according to claim 5 wherein the partition extends about half-way across the pond.

7. A heat removal system comprising:
   (a) a heat storage pond having a liquid heat storage layer at the bottom of the pond and an insulating layer at the top covering the heat storage layer;
   (b) a vertical partition in the pond for dividing at least the heat storage layer into two, laterally displaced heat storage portions, the partition teminating short of an edge of the pond for establishing an interconnection between the two heat storage portions;
   (c) a heat exchanger;
   (d) piping connecting the heat exchanger between the two portions; and
   (e) a trough in each of the two heat storage portions at the bottom of the pond opening into the heat storage layer, each trough being located adjacent said one edge and extending traversely to the direction of the partition for acting as a header for liquid that passes through the piping.

8. A heat removal system according to claim 7 wherein the cross-sectional area of each trough changes as a function of distance from the partition.

9. A heat removal system according to claim 8 wherein each trough is deepest adjacent the partition.

10. A heat removal system according to claim 9 wherein the piping is connected to a pump located beneath the troughs at their deepest points.

11. A heat removal system according to claim 10 wherein the partition extends vertically from the bottom of the pond to an elevation that is no less than the depth of the heat storage layer whereby the pond is divided into two interconnected portions.

12. A heat storage removal system according to claim 10 wherein the heat storage pond is a solar pond, and the insulating layer at the top of the heat storage layer is a non-convective halocline whose salinity increases with depth.

13. A heat removal system according to claim 12 wherein the halocline is covered with a wind-mixed layer of substantially uniform salinity.

14. A heat removal system according to claim 11 in combination with a power plant for converting heat extracted by the heat exchanger into electrical energy.

15. The combination of claim 14 wherein the heat exchanger contains an organic fluid that is vaporized when water from the heat storage layer is pumped through the heat exchanger, and the power plant includes a turbine driven by vaporized fluid produced by the boiler for producing electrical energy, a condenser for condensing vapor exhausted by the turbine, and means for returning the condensate produced by the condenser to the heat exchanger.

16. The combination of claim 15 wherein the heat storage pond is a solar pond, and the insulating layer at the top of the heat storage layer is a nonconvecting halocline whose salinity increases with depth.

17. The combination of claim 16 wherein the halocline is covered by a wind-mixed layer of substantially uniform salinity.

18. The combination of claim 17 wherein the condenser is cooled with water from the wind-mixed layer.

19. The combination of claim 18 wherein the bottom of the pond is lined with a layer that is water-impermeable and is insulated beneath said layer to reduce heat loss from the heat storage layer.

20. The combination of claim 18 including an auxiliary trough in the walls defining said one edge of the pond in each of said two interconnected portions, each auxiliary trough extending transversely to the direction of the partition for acting as a header for water that passes through the condenser.

21. The combination of claim 20 wherein the auxiliary trough to which water that cools the condenser is returned is provided with a perforated gate that separates the last-mentioned auxiliary trough from the wind-mixed layer.

22. A heat removal system comprising:
(a) a heat storage pond having a liquid heat storage layer at the bottom of the pond and an insulating layer at the top covering the heat storage layer;
(b) a vertical partition in the pond for dividing at least the heat storage layer into two, laterally displaced heat storage portions, the partition originating at one edge of the pond and terminating short of the opposite edge of the pond for establishing an interconnection between the two heat storage portions;
(c) a heat exchanger; and
(d) a pair of pipes respectively connected to the two heat storage portions at said one edge of the pond for connecting said portions to said heat exchanger.

* * * * *